Figure 1:
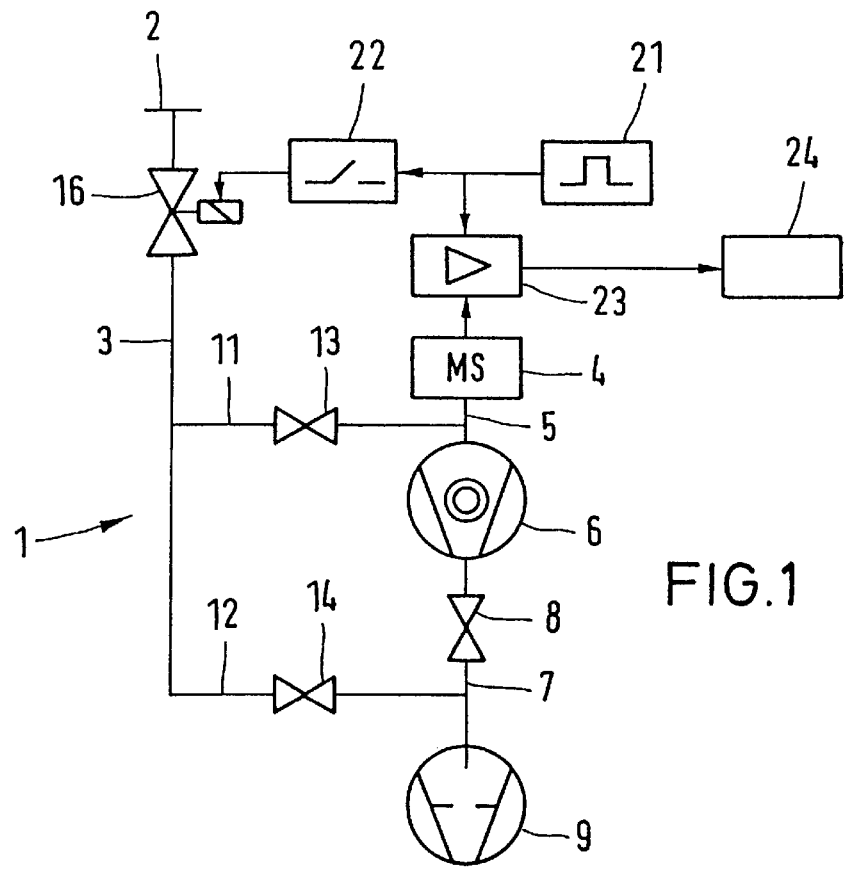

United States Patent
Bohm et al.

[11] Patent Number: 5,821,404
[45] Date of Patent: Oct. 13, 1998

[54] TEST GAS LEAK INDICATOR

[75] Inventors: Thomas Bohm, Cologne; Ulrich Dobler, Wermelskirchen; Werner Grosse Bley, Bonn, all of Germany

[73] Assignee: Balzers und Leybold Deutschland Holding AG, Germany

[21] Appl. No.: 702,696
[22] PCT Filed: Jan. 19, 1995
[86] PCT No.: PCT/EP95/00186
§ 371 Date: Sep. 6, 1996
§ 102(e) Date: Sep. 6, 1996
[87] PCT Pub. No.: WO95/25267
PCT Pub. Date: Sep. 21, 1995

[30] Foreign Application Priority Data
Mar. 16, 1994 [DE] Germany ............... 44 08 877.9

[51] Int. Cl.⁶ ......................................... G01M 3/20
[52] U.S. Cl. ............................................... 73/40.7
[58] Field of Search ........................... 73/40, 40.7

[56] References Cited
U.S. PATENT DOCUMENTS 4,510,792  4/1985  Morel et al. ..................... 73/40.7
4,773,256  9/1988  Saulgeot .......................... 73/40.7
5,297,422  3/1994  Baret ............................... 73/40.7
5,369,982  12/1994 Holthaus .......................... 73/40

FOREIGN PATENT DOCUMENTS 481414   4/1992  European Pat. Off. ........... 73/40.7
4140366  6/1993  Germany ........................... 73/40.7

Primary Examiner—Herzron E. Williams
Assistant Examiner—Daniel S. Larkin
Attorney, Agent, or Firm—Wall Marjama & Bilinski

[57] ABSTRACT

The invention relates to a process for operating a test gas leak indicator (1) with a gas inlet (2) and a test gas-sensitive detector (4), in which all or part of a stream of gas containing the test gas reaching the inlet (2) is taken to the detector (4) in the event of a leak; in order to improve the sensitivity of the leakage detection, it is proposed that the stream of gas be preferably periodically modulated and the signal from the test gas detector (4) be processed in synchronism with the modulation of the gas flow.

4 Claims, 1 Drawing Sheet

TEST GAS LEAK INDICATOR

BACKGROUND OF THE INVENTION

The invention relates to a process for operating a test gas leak indicator as well as a test gas leak indicator suitable for implementation of this process.

Test gas leak indicators of the kind affected here are connected to a test chamber, for example, which contains one or several test objects. In the case of one test object having a leak, test gas contained within the test object enters into the test chamber and passes from there into the test gas leak indicator through which the test gas is recorded. In the case of a further leak detection method, the test object itself is linked to the inlet of the test gas leak indicator. The test object is sprayed with test gas from the outside. If the test object has a leak, test gas will enter into the test object and then into the test gas leak indicator.

The gas, which in the event of a leak contains the test gas, entering into the test gas leak indicator's inlet may be supplied directly to the sensor (test gas detector) in the test gas leak indicator. When employing helium as the test gas, the test gas leak indicator is commonly a mass spectrometer set to mass 4, which has a relatively low operating pressure thus requiring a high vacuum pump with a downstream backing pump. If the gas, in which the presence of the test gas is to be detected, is applied directly to the mass spectrometer, these pressure conditions must be taken into account. A further possibility is to supply the gas which is to be investigated to the discharge of the high vacuum pump. Possibly present helium passes upstream within the high vacuum pump into the mass spectrometer and is recorded there (counter-flow principle).

SUMMARY OF THE INVENTION

The sensitivity of test gas leak indicators of the described kind is, among other things, limited by the internal test gas or helium background. The cause for this background is, in particular, helium from preceding measurements which has diffused into the seals and/or the oil of the backing pump. Test gas escaping slowly from the seals and the oil passes upstream through the vacuum pumps into the mass spectrometer and thereby causes the undesirable background.

It is the task of the present invention to improve the sensitivity of test gas leak indication.

This task is solved by modulating the gas flow at the inlet of the test gas leak indicator according to the characteristic features of the patent claims. By applying the present invention, non-modulated interference, in particular the non-modulated background of test gas within the instrument, can be eliminated by reliance on the principle of phase-sensitive rectification. There thus exists the possibility of being able to detect very low leak rates even in the presence of high background levels. A further advantage of the process according to the present invention is, that the time response at very low signal levels/leak rates is significantly improved over the state-of-the-art.

Figures 2, 3:
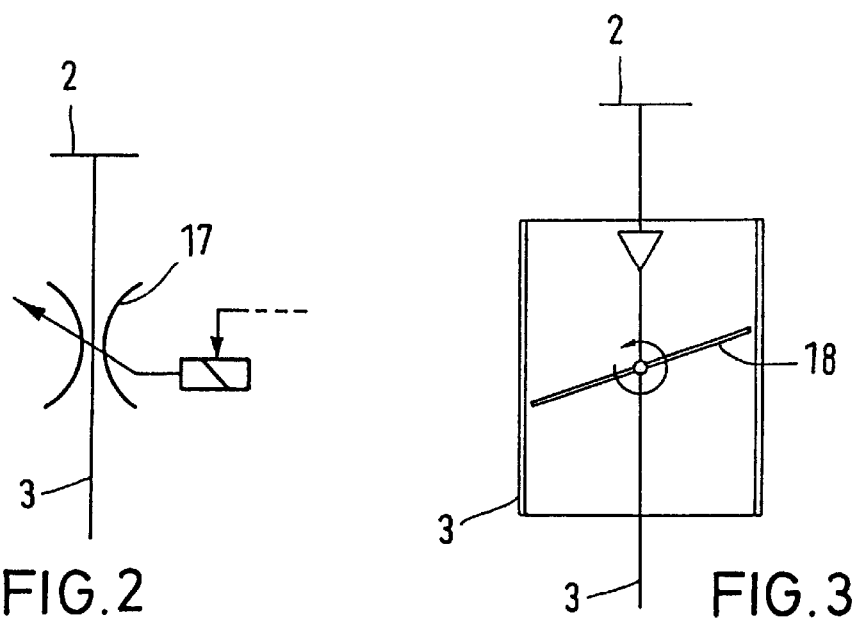

Further advantages and details of the present invention shall be explained by referring to the design examples presented in drawing FIGS. 1 to 3.

Shown in drawing FIG. 1 is a schematic design example for a test gas leak indicator operating according to the present invention and Shown in drawing FIGS. 2 and 3 are alternatives for the devices employed for modulating the gas flow at the inlet.

DESCRIPTION OF THE INVENTION

In the case of the test gas leak indicator according to drawing FIG. 1, the inlet is designated as 2, the line which follows at the inlet 2 is designated as 3 and the test gas leak indicator designed as a mass spectrometer is designated as 4. The high vacuum pump 6 (preferably a turbomolecular pump) is connected via line 5 to the inlet of the mass spectrometer 4. Following at the discharge of the high vacuum pump 6, is a line 7 with valve 8 which connects to the inlet of the backing pump 9. Connected to line 3 are line sections 11, 12 with valves 13, 14. The gas which enters via inlet 2 passes via lines 11, 12 either directly (line 11) or indirectly (line 12) into the mass spectrometer 4. The passage of the gas is selected through valves 13, 14. When valves 8 and 13 are closed and with valve 14 open, the backing pump 9 may serve the purpose of evacuating the test object or the test chamber (not shown), which, prior to the leak detection process, is connected to inlet 2.

In order to ensure operation of the test gas leak indicator 1 in accordance with the present invention, there is located in line 3 a component which permits the passing gas to be modulated. In the design example according to drawing FIG. 1, a valve 16 is provided, the cross section of which is variable. Shown in drawing FIGS. 2 and 3 is a controllable constriction 17 or a rotating butterfly valve 18 in line 3. All components permit a preferably periodic modulation of the gas flow at the inlet.

Drawing FIG. 1 shows, that for actuation of the valve 16, a switch 22 is provided which in turn is actuated by frequency generator 21. The signal delivered by frequency generator 21 is also supplied to an amplifier 23 as the reference signal. Amplifier 23 serves the purpose of processing the signals supplied by the test gas indicator 4. After amplification and phase-sensitive rectification in line with the LOCK-IN principle, the signal is indicated. The signal indicator is represented by block 24.

In case of a modulated gas flow at the inlet, a signal which is also modulated is present at the ion collector of the mass spectrometer, whereby this signal is processed in synchronism by the amplifier operating according to the LOCK-IN principle, so that a DC signal is produced and displayed at 24. In particular, interference caused by a helium background is thus eliminated. Extremely low leak rates can still be detected. The signal frequency f produced by the frequency generator should be lower than the reciprocal of the time constant t of the vacuum system, so that the signal at the ion collector is still modulated (with a sufficiently large amplitude).

What is claimed is:

1. A process for operating a test gas leak indicator, said indicator having a gas inlet, a test gas detector for providing output signals, delivery means in which all or part of a stream of gas is continuously delivered to the test gas detector, said stream of gas containing the test gas in the event of a leak and reaching the gas inlet, said process including the steps of periodically modulating the gas flow, processing the signals from the test gas detector in synchronism with the modulated gas flow, maintaining a modulation frequency and a signal processing frequency outside the main frequency range of a vacuum system or a given range of time constants of the vacuum system.

2. The process of claim 1 that includes the further steps of connecting a high vacuum pump to the test gas detector and supplying the gas flow to the test gas detector in a counter flow arrangement through the high vacuum pump.

3. A test gas leak indicator apparatus comprising an inlet, a test gas detector for providing output signals, delivery means in which all or part of a stream of gas is continuously delivered to the test gas detector, said stream of gas containing the test gas in the event of a leak and reaching the inlet, modulating means for periodically modulating the gas flow, and processing means for processing the signal from the test gas detector in synchronism with modulated gas flow, wherein the test gas detector is a mass spectrometer having an inlet attached to a high vacuum pump, said apparatus including an amplifier connected to the signal output of said mass spectrometer and a frequency generator for controlling the modulating means and the amplifier.

4. The apparatus of claim 3, wherein the modulating means is one of a controllable valve a controllable constriction, and a rotating butterfly valve.

* * * * *